(12) United States Patent
Benedetti et al.

(10) Patent No.: US 7,364,382 B2
(45) Date of Patent: *Apr. 29, 2008

(54) METAL/PLASTIC INSERT MOLDED SILL PLATE FASTENER

(75) Inventors: Steven M. Benedetti, Sterling Heights, MI (US); Rosalind A. Nessel, Birmingham, MI (US)

(73) Assignee: Newfrey LLC, Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/505,614

(22) Filed: Aug. 17, 2006

(65) Prior Publication Data

US 2006/0280554 A1    Dec. 14, 2006

Related U.S. Application Data

(62) Division of application No. 10/829,103, filed on Apr. 21, 2004, now Pat. No. 7,186,051.

(60) Provisional application No. 60/469,438, filed on May 9, 2003.

(51) Int. Cl.
*E25G 3/36* (2006.01)
*E04G 7/00* (2006.01)
*F16B 5/02* (2006.01)

(52) U.S. Cl. .................. 403/388; 403/329; 403/397; 411/508; 411/509; 411/510; 411/903; 411/908; 411/913; 24/297; 24/453; 24/702

(58) Field of Classification Search ................ 403/388, 403/397, 329, 408.1; 411/913, 908, 508–510, 411/903; 24/297, 453, 702
See application file for complete search history.

(56) References Cited

U.S. PATENT DOCUMENTS

| 2,815,554 A | 12/1957 | Pieper |
| 3,018,529 A | 1/1962 | Perrochat |
| 3,029,486 A | 4/1962 | Raymond |
| 3,183,030 A | 5/1965 | Schleuter |
| 3,703,747 A | 11/1972 | Hamman |
| 3,810,279 A | 5/1974 | Swick et al. |

(Continued)

FOREIGN PATENT DOCUMENTS

EP    1 059 461    12/2000

(Continued)

*Primary Examiner*—Daniel P. Stodola
*Assistant Examiner*—Nahid Amiri
(74) *Attorney, Agent, or Firm*—Harness, Dickey & Pierce, P.L.C.

(57) ABSTRACT

A fastener for joining trim pieces to a motor vehicle includes a metal insert molded into an elastomeric body of a fastener. An anti-rotational rib prevents excessive rotation of the fastener after installation. Oppositely extending flexible wings of the metal insert are spaced from each other to allow full deflection upon insert of the fastener without interference between the flexible wings. Protective guards formed at distal ends of a pair of support legs provide improved insertion alignment for the fastener as well as protection between the fastener and metal surfaces of the vehicle. In another embodiment of the present disclosure, a dog house assembly is provided having aperture and slots mating with the installation features of the silver plate fastener. In still another embodiment, a method for installing a silver plate molding into a vehicle using a fastener of the present disclosure is provided.

12 Claims, 6 Drawing Sheets

U.S. PATENT DOCUMENTS

| | | | |
|---|---|---|---|
| 3,988,808 A | | 11/1976 | Poe et al. |
| 4,176,428 A | | 12/1979 | Kimura |
| 4,261,243 A | | 4/1981 | Palmer |
| 4,363,160 A | * | 12/1982 | Wibrow ........................ 24/297 |
| 4,505,611 A | | 3/1985 | Nagashima et al. |
| 4,517,711 A | | 5/1985 | Tanaka |
| D293,883 S | | 1/1988 | Hirohata |
| 4,716,633 A | | 1/1988 | Rizo |
| 4,750,878 A | | 6/1988 | Nix et al. |
| 4,810,147 A | | 3/1989 | Hirohata |
| 4,861,208 A | | 8/1989 | Boundy |
| 4,867,599 A | | 9/1989 | Sasajima |
| 4,874,276 A | | 10/1989 | Iguchi |
| 4,927,287 A | * | 5/1990 | Ohkawa et al. .......... 403/408.1 |
| 4,932,105 A | | 6/1990 | Muller |
| 5,168,604 A | | 12/1992 | Boville |
| 5,195,793 A | | 3/1993 | Maki |
| 5,339,491 A | | 8/1994 | Sims |
| 5,444,898 A | * | 8/1995 | Norvell ........................ 24/389 |
| 5,448,809 A | | 9/1995 | Kraus |
| 5,494,392 A | | 2/1996 | Vogel et al. |
| 5,507,610 A | | 4/1996 | Benedetti et al. |
| 5,531,499 A | | 7/1996 | Vecchio et al. |
| 5,542,158 A | | 8/1996 | Gronau et al. |
| 5,592,719 A | | 1/1997 | Eto et al. |
| 5,704,753 A | * | 1/1998 | Ueno ........................ 411/509 |
| 5,850,676 A | | 12/1998 | Takahashi et al. |
| 6,049,952 A | | 4/2000 | Mihelich et al. |
| 6,253,423 B1 | | 7/2001 | Friedrich et al. |
| 6,322,126 B1 | | 11/2001 | Kraus |
| 6,371,550 B2 | | 4/2002 | Iwatsuki et al. |
| 6,438,804 B1 | | 8/2002 | Romero Magariño |
| 6,453,522 B1 | | 9/2002 | Romero Magariño et al. |
| 6,474,921 B1 | | 11/2002 | Gordon |
| 6,514,023 B2 | * | 2/2003 | Moerke ........................ 411/45 |
| 6,644,902 B1 | | 11/2003 | Cutshall |
| 6,648,542 B2 | * | 11/2003 | Smith et al. ................. 403/291 |
| 6,669,274 B2 | | 12/2003 | Barnard et al. |
| 6,715,185 B2 | | 4/2004 | Angellotti |
| 2002/0043041 A1 | | 4/2002 | Yoyasu |
| 2003/0000048 A1 | | 1/2003 | Boville |
| 2003/0159256 A1 | | 8/2003 | Clarke |
| 2004/0047705 A1 | | 3/2004 | Cutshall |
| 2004/0240932 A1 | * | 12/2004 | Benedetti |
| 2005/0034282 A1 | * | 2/2005 | Kurily et al. |

FOREIGN PATENT DOCUMENTS

| | | | |
|---|---|---|---|
| FR | | 84 950 | 5/1965 |
| FR | | 2 748 300 | 11/1997 |
| GB | | 1 065 914 | 4/1967 |
| GB | | 2 316 707 A | 3/1998 |
| GB | | 2316707 A * | 3/1998 |
| JP | | 11125224 A | 5/1999 |
| WO | | WO 9911154 A1 | 3/1999 |

\* cited by examiner

METAL/PLASTIC INSERT MOLDED SILL PLATE FASTENER

CROSS-REFERENCE TO RELATED APPLICATIONS

This application is a divisional of U.S. patent application Ser. No. 10/829,103 filed on Apr. 21, 2004 now U.S. Pat. No. 7,186,051, which claims the benefit of U.S. Provisional Application No. 60/469,438, filed on May 9, 2003. The disclosures of the above applications are incorporated herein by reference.

FIELD

The present disclosure relates generally to fasteners and more specifically to a fastener design for joining trim pieces to the interior surfaces of automobiles.

BACKGROUND

For automotive applications, fasteners are used to join trim pieces to sections or metal body portions of the automobile. The requirements for these fasteners are that they be insertable into apertures of the automobile and meet requirements to both retain the insert as well as provide a minimum pullout retention force such that the insert can be removed without damaging the insert. Common fastener designs include directly opposed flexible wings which deflect inwardly upon insertion of the fastener and expand by spring force to hold the fastener within a rectangular slot in the automobile. A drawback of commonly used fasteners is the inability of the fastener to compensate for misalignment between the fastener location and the aperture in the automobile. A further drawback is the inability of commonly used fasteners to accommodate slight rotation of the assembled joint in order to compensate for further misalignment between the fastener and the aperture of the automobile.

Another drawback of some existing designs for fasteners is the all metal body of the fastener itself. An all-metal fastener can result in corrosion between the metal contact surfaces between the fastener and the automobile as well as causing damage to the area of the aperture of the automobile upon insertion of the fastener or removal of the fastener.

SUMMARY

According to a preferred embodiment of the present disclosure, an apparatus is provided for adjoining accessories to panels on the interior of vehicles. The apparatus includes a molded fastener body which further includes a head, a neck joined to the head, a flexible skirt joined to the neck, an anti-rotation feature joined to both the neck and skirt, and a pair of support legs perpendicularly from an underside of the skirt. A metal insert is positioned between the pair of support legs and molded at the same time as the molded fastener is formed such that the metal insert is non-removably joined to the molded fastener portion. The metal insert includes a pair of support legs which surround a pair of flexible wings. Each of the flexible wings extends toward an opposite face of the metal insert such that the flexible wings deflect inwardly upon insertion of the apparatus and return by spring force to retain the apparatus in the installed position with the vehicle.

The anti-rotation feature is provided in the form of a generally V-shaped neck which mates with a similarly formed slot in an upper surface of a dog-house formed in the accessory joined to the vehicle. The anti-rotation feature permits a small degree of rotation of the apparatus to allow for fit-up but precludes further rotation. Each of the flexible wings also optionally includes an additional raised portion for improving the retention capability of each of the flexible wings. The support legs also provide at distal ends a protective guard feature such that the elastomeric material of the molded fastener body contacts the vehicle surface first to prevent potential damage between the fastener and the vehicle. Each of the protective guards also includes a tapered end feature to help align the fastener upon assembly.

In another embodiment of the present disclosure, a dog-house design is provided in the accessory having an aperture and a lead-in slot configured to align with the neck and anti-rotation feature of the fastener. In a further embodiment of the present disclosure, a method for joining a seal plate molding to a seal plate of a vehicle is provided.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

DRAWINGS

The present disclosure will become more fully understood from the detailed description and the accompanying drawings, wherein.

DETAILED DESCRIPTION

The following description is merely exemplary in nature and is not intended to limit the present disclosure, application, or uses.

Figure 1:
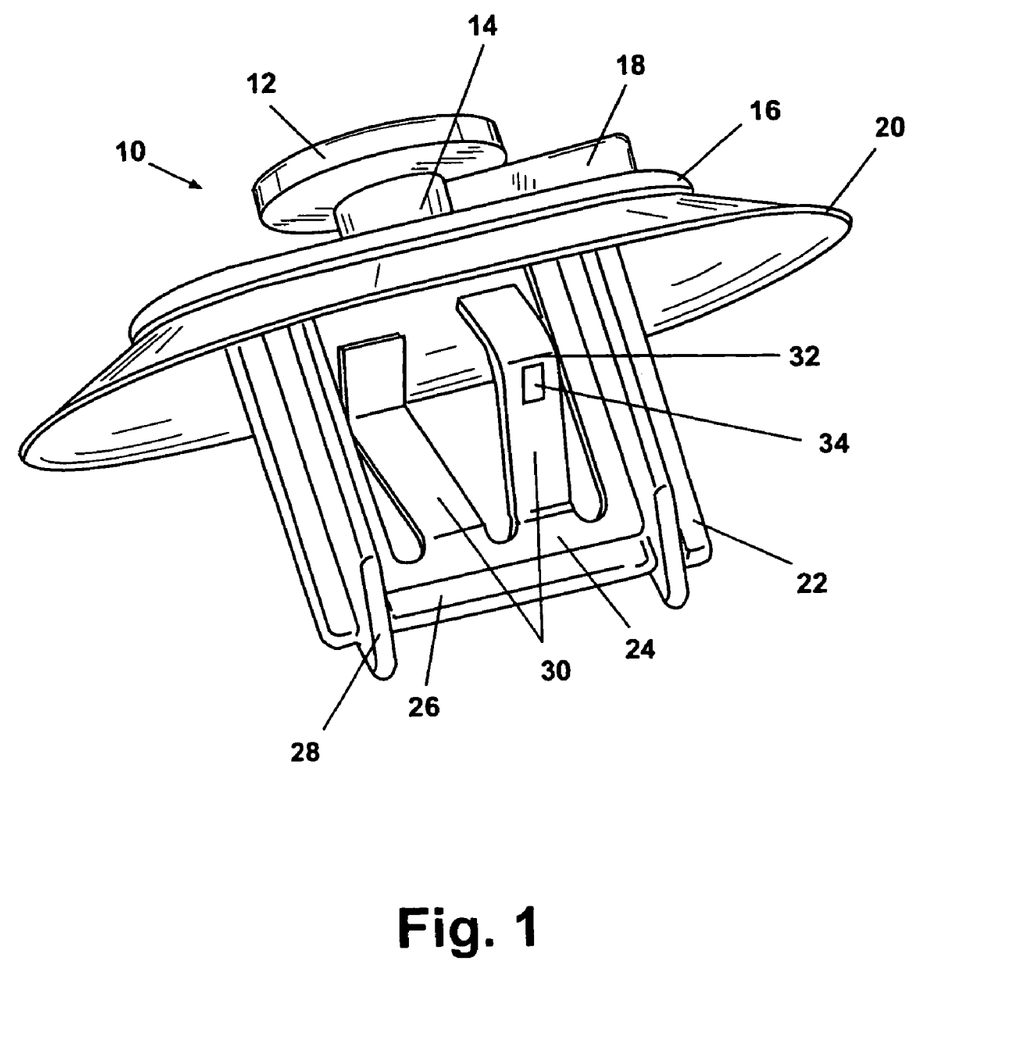
FIG. 1 is a perspective view of a fastener of the present disclosure.

According to one preferred embodiment of the present disclosure, a fastener 10 includes a circular head 12 molded to a neck region 14. The neck region is co-molded to a top surface 16. An anti-rotation rib 18 which is formed in a general V-shaped configuration having its apex joined to neck region 14 is co-molded between neck region 14 and top surface 16. A flexible skirt 20 having a generally oval shape is co-molded to top surface 16 and extends generally downward and at an angle away from top surface 16. The top surface 16 is a generally planar portion of fastener 10 and also forms one of the surfaces for joining fastener 10 to a dog-house assembly which will be described in further detail in reference to FIGS. 3 and 4.

A pair of angled support legs 22 extend perpendicularly from an undersurface of the flexible skirt 20. Each of the angled support legs 22 support opposed outer perimeter edges of a metal insert 24. A cross member 26 is connectably molded between distal ends of each of the support legs 22. Cross member 26 also provides support for a lower edge of metal insert 24. Each of the support legs 22 at the distal ends is provided with a guard portion 28 having tapered ends such that the tapered ends angle toward the distal ends of each of the support legs 22.

Metal insert 24 includes a pair of deflection wings 30 which are formed at a lower edge of metal insert 24. Each of the deflection wings 30 includes a bend at a lower portion thereof and each extends in an opposite direction from the other such that each deflection wing 30 is positioned towards an opposite face of metal insert 24, which is formed as a generally planar surface. Deflection wings 30 are each spaced from one another at the base portion such that deflection wings 30 can deflect towards each other, but do not oppose each other directly. This permits full deflection of deflection wings 30 without interfering with each other during the deflection portion of travel. Each deflection wing 30 also includes an upper bend 32 having an inwardly tapering section formed thereafter. Optionally, an engagement rib 34 is formed adjacent to each bend portion 32 to provide additional retention capability for deflection wings 30.

Figure 2:
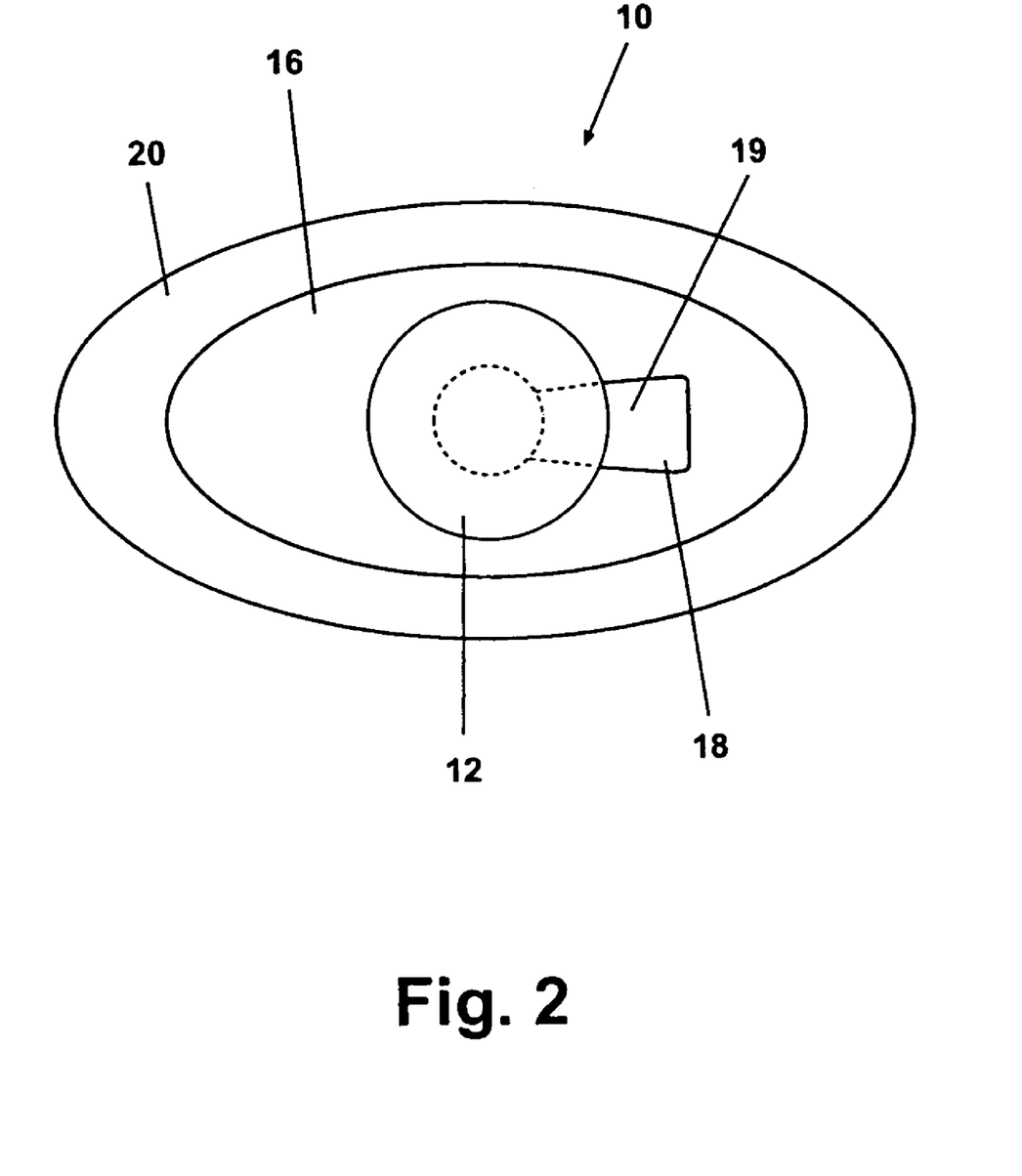
FIG. 2 is a plan view of the fastener of the present disclosure.

Referring next to FIG. 2, the generally oval shape of flexible skirt 20 is seen. The generally V-shaped configuration of anti-rotational rib 18 is also visible in this view having a body 19 extending outwardly from an outer diameter of neck region 14. Circular head 12 is generally centrally positioned on the top surface 16.

Figure 3:
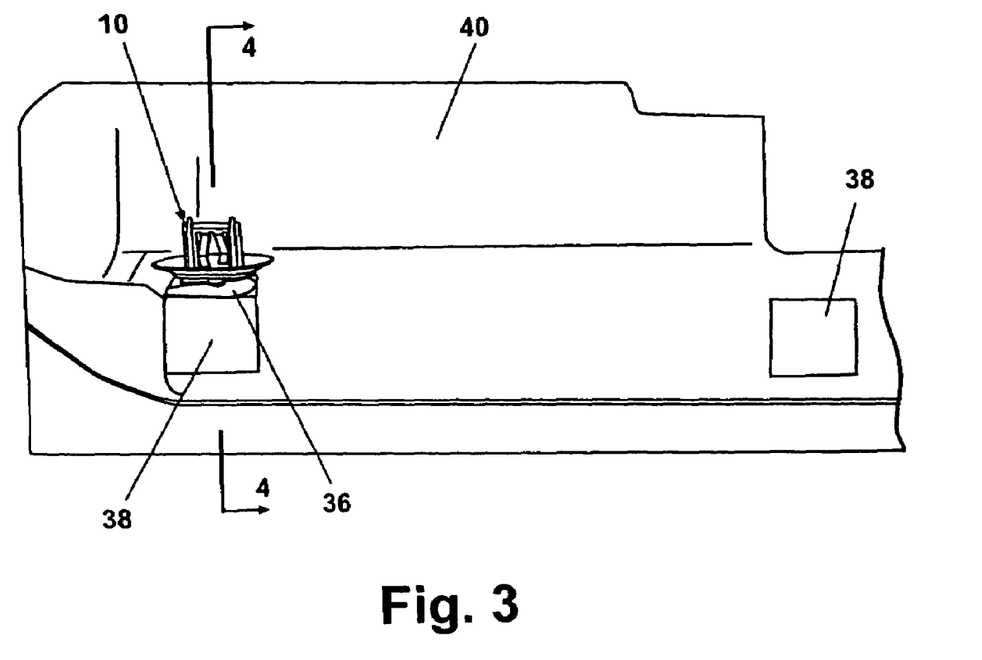
FIG. 3 is a perspective view of a fastener of the present disclosure joined to a dog-house assembly co-molded to a trim plate molding the present disclosure.
Figure 4:
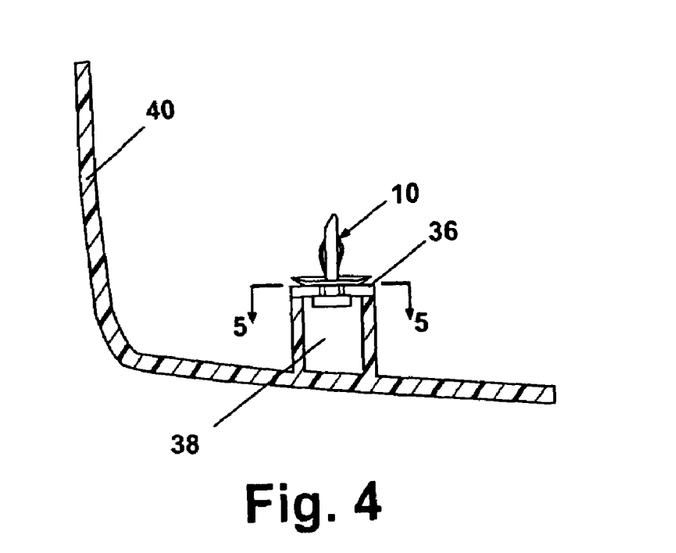
FIG. 4 is an end elevational view taken at Section 4-4 of FIG. 3.

Referring next to FIGS. 3 through 6, a mating face 36 of a dog-house assembly 38 is shown. The dog-house assembly 38 is co-molded with a trim plate molding 40. An exemplary installation of fastener 10 onto mating face 36 is shown in FIG. 3. When installed as shown, and referring back to FIG. 1, circular head 12 fits below mating face 36 while top surface 16 fits above and in contact with mating face 36. In this position, each of the support legs 22 is directed upward as well as the flexible skirt 20. From this sub-assembly position, support legs 22 and deflection wings 30 are insertable into a generally rectangular shaped aperture (further described in reference to FIG. 6), of a vehicle trim plate, such that guard portions 28 first contact a rectangular shaped aperture 50 and provide a lead-in feature for support legs 22. Deflection wings 30 deflect inwardly upon contact with side walls 52 of the generally rectangular shaped aperture 50 as fastener 10 is further inserted. Insertion of fastener 10 is complete when bend portions 32 extend entirely through the rectangular shaped aperture 50 allowing deflection wings 30 to deflect by spring force to retain the fastener 10 in position. At this time, flexible skirt 20 engages a generally flat surface 48 surrounding the rectangular shaped aperture of the vehicle to provide a moisture and soil seal to prevent moisture and soil from contacting metal insert 24 and the general area surrounding the rectangular shaped aperture of the vehicle.

Figure 5:
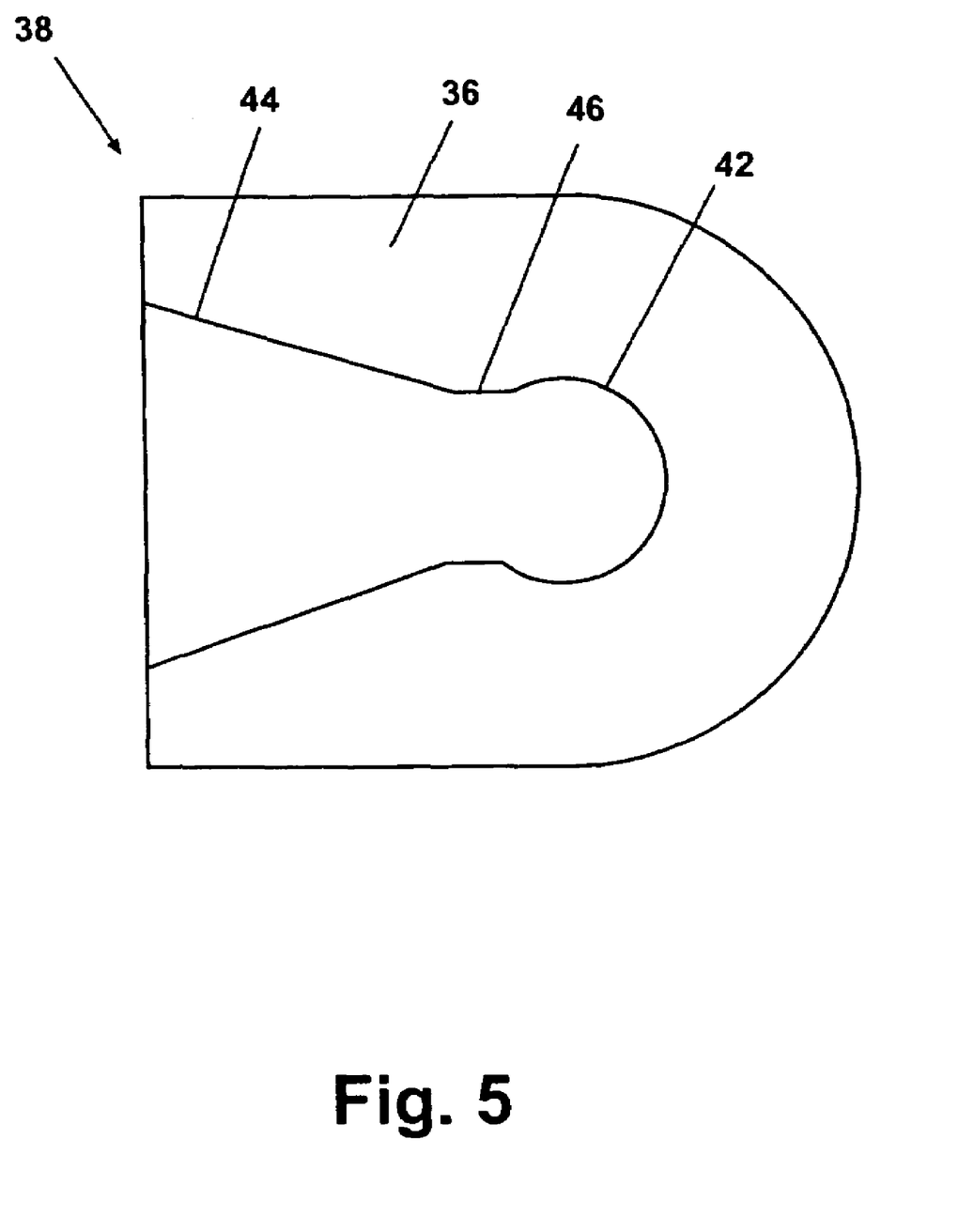
FIG. 5 is a plan view of the dog-house assembly of FIG. 3.
Figure 6:
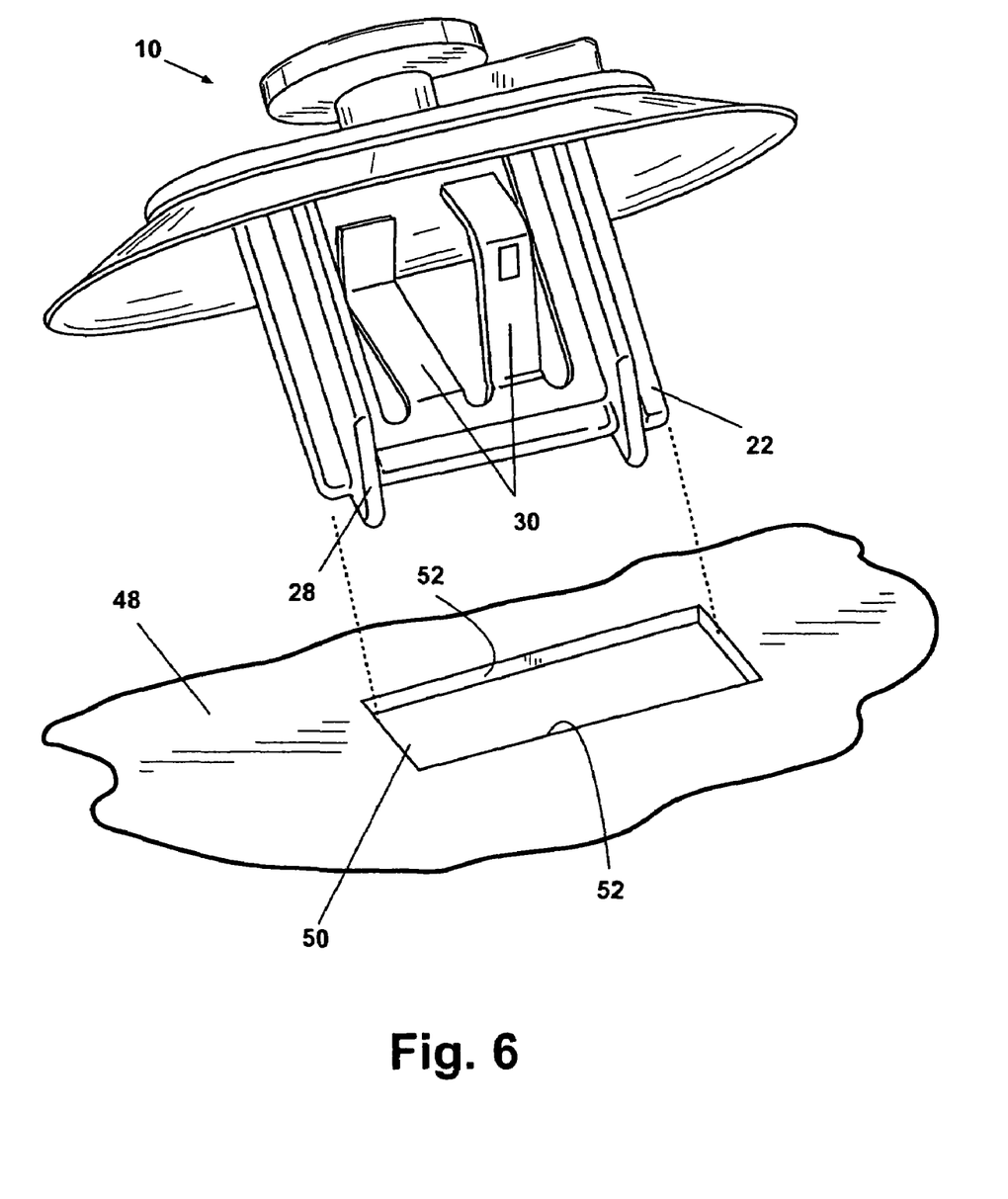
FIG. 6 is a perspective view of a fastener of the present disclosure showing prior engagement with a rectangular shaped aperture of a vehicle.

Referring specifically to FIG. 5, the mating face 36 of dog house assembly 38 (shown in Figure) is provided with a generally circular aperture 42 sized to permit entry of neck region 14. V-shaped slot 44 is configured to enclose anti-rotational rib 18 while allowing a certain degree of deflection (approximately 7 degrees of deflection). A throat region 46 is sized slightly smaller than a diameter of aperture 42 to provide a positive retention feature for neck region 14 after neck region 14 is pressed into aperture 42.

Figure 7:
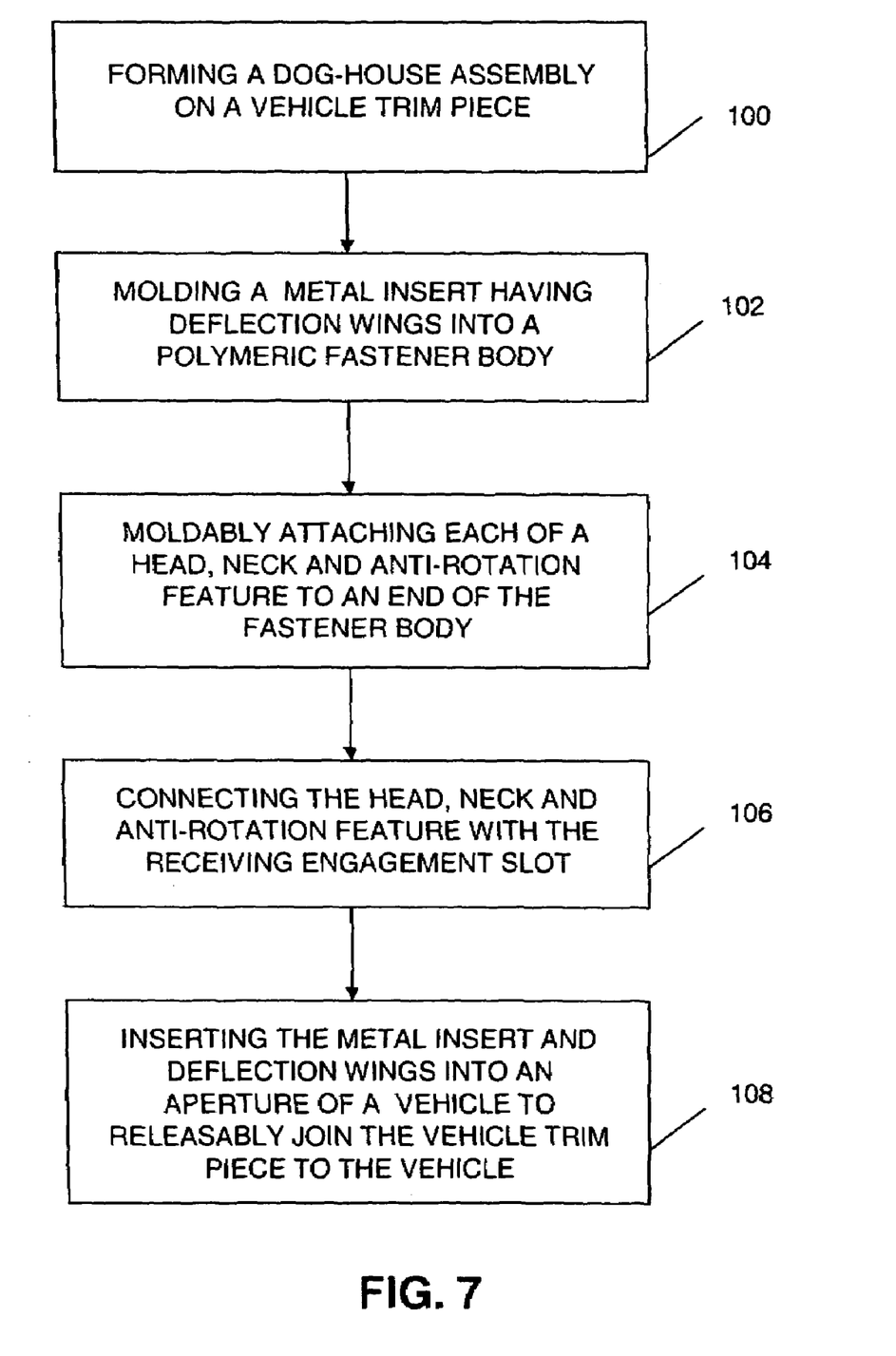
FIG. 7 is a flow diagram of the steps to apply a fastener of the present disclosure.

Referring to FIG. 7, the steps to apply a fastener of the present disclosure to join a trim piece molding to a vehicle include a step 100, forming a dog-house assembly on a vehicle trim piece. In step 102, a metal insert having deflection wings is molded into a polymeric fastener body. At step 104, each of a head, neck and anti-rotation feature are moldably attached to an end of the fastener body. At step 106, the head, neck and anti-rotation features are connected with a receiving engagement slot. At final step 108, the metal insert and deflection wings are inserted into an aperture of a vehicle to releasably join the vehicle trim piece to the vehicle.

A molded sill plate fastener of the present disclosure provides several advantages. The anti-rotational rib of the present disclosure allows fastener assembly onto a dog-house permitting both a small degree of rotation and a positive rotation stop. This permits some angular misalignment between the fastener and an aperture of the motor vehicle. By molding a metal insert into a generally elastomeric body of the present disclosure, a one-piece fastener is formed having the spring force capability of metal deflection wings within an elastomeric body to protect the automobile surfaces when the fastener is installed. The flexible skirt of the present disclosure provides a moisture and dirt seal to minimize moisture and dirt entrance into the area of the metal insert and rectangular shaped aperture of the automobile. Protective guards/lead-in features of the present disclosure help prevent damage to the vehicle upon installation of the fastener as well as provide a more positive alignment means for the fastener during assembly. Optional use of engagement ribs formed adjacent to the bend portions of the deflection wings also provides additional retention capability for the deflection wings. Finally, by spacing each of the deflection wings laterally apart from each other and initially extending them towards opposite sides of the metal insert and towards opposite sides of the support legs, the deflection wings are free to fully deflect inwardly without contacting each other thus providing greater retention capability of the fasteners.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A system including an accessory for joining the accessory and an interior panel of a vehicle, the system comprising:
   a solid molded polymeric fastener body including a head; a neck joined to the head and a skirt; a V-shaped anti-rotation feature joined to both the neck and the skirt; and a pair of support legs extending perpendicularly from an underside of the skirt;
   a solid metal insert positioned between the pair of support legs including a pair of spaced flexible wings each formed to extend oppositely away from each other; and
   the accessory including a trim piece having at least one dog-house assembly joined thereto for receiving the molded fastener body.

2. The system of claim 1, comprising a vehicle aperture generally having a rectangular shape for receiving the pair of support legs and the spaced flexible wings of the molded fastener body.

3. The system of claim 2, wherein the skirt comprises a flexible skirt formed between the neck and support legs, the flexible skirt acting as a moisture/soil seal between the molded fastener body and a vehicle plate surface having the vehicle aperture adjacent thereto.

4. The system of claim 1, wherein the trim piece and the at least one dog-house assembly comprise an elastomeric material.

5. A system including an accessory for joining the accessory and an interior panel of a vehicle, the system comprising:
   a solid molded polymeric fastener body including a head; a neck joined to the head and a skirt; a V-shaped anti-rotation feature joined to both the neck and the skirt; and a pair of support legs extending perpendicularly from an underside of the skirt;
   a solid metal insert positioned between the pair of support legs including a pair of spaced flexible wings each formed to extend oppositely away from each other;
   the accessory including a trim piece having at least one dog-house assembly joined thereto for receiving the molded fastener body;
   the anti-rotation feature has a V-shaped body; and
   the dog-house assembly includes a V-shaped slot to receive the anti-rotation feature.

6. A system for including an accessory for joining the accessory and an interior panel of a vehicle, the system comprising:
   a solid molded polymeric fastener body including a head; a neck joined to the head and a skirt; a V-shaped anti-rotation feature joined to both the neck and the skirt; and a pair of support legs extending perpendicularly from an underside of the skirt;
   a solid metal insert positioned between the pair of support legs including a pair of spaced flexible wings each formed to extend oppositely away from each other;
   the accessory including a trim piece having at least one dog-house assembly joined thereto for receiving the molded fastener body;
   the dog-house assembly includes a circular shaped aperture to receive the neck of the molded fastener; and
   the dog-house assembly includes a throat region providing an interference fit between the throat region and the neck to positively retain the neck within the circular shaped aperture when the molded fastener is joined to the dog-house assembly.

7. A system including an accessory for joining the accessory and an interior panel of a vehicle, the system comprising:
   a solid molded polymeric fastener body including a head; a neck joined to the head and a skirt; a V-shaped anti-rotation feature joined to both the neck and the skirt; and a pair of support legs extending perpendicularly from an underside of the skirt;
   a solid metal insert positioned between the pair of support legs including a pair of spaced flexible wings each formed to extend oppositely away from each other;
   the accessory including a trim piece having at least one dog-house assembly joined thereto for receiving the molded fastener body; and
   an assembly formed by the molded fastener body releasably joined to the dog-house assembly of the trim piece and the flexible wings engageably joined with the vehicle aperture.

8. A system including an accessory for joining the accessory and an interior panel of a vehicle, the system comprising:
   a solid molded polymeric fastener body including:
   a head;
   a neck joined to the head and a skirt;
   a V-shaped anti-rotation feature joined to both the neck and the skirt having an apex at the neck and a body portion extending radially therefrom; and
   a pair of support legs extending perpendicularly from an underside of the skirt;
   a pair of spaced flexible wings positioned between the pair of support legs, the flexible wings each formed to extend oppositely away from each other;
   the accessory including a vehicle attachment piece having at least one dog-house assembly joined thereto for receiving the molded fastener body;
   a cross member connectably molded between distal ends of each of the support legs; and
   a solid metal insert positioned between the pair of support legs and partially connected to the cross member, the pair of spaced flexible wings homogenously extending from the metal insert.

9. The system according to claim 8, further comprising a mating face of the dog house assembly provided with a generally circular aperture sized to permit entry of the neck.

10. The system according to claim 9, wherein the dog house assembly further comprises a V-shaped slot adapted to receive and engage the body portion of the anti-rotation feature.

11. The system according to claim 10, wherein the dog house assembly further comprises a throat region sized smaller than a diameter of the aperture, the throat region operable to create a positive retention feature for the neck when the neck is pressed into the aperture.

12. The system according to claim 8, having the flexible wings connected to the metal insert proximate the cross member, the flexible wings operable to deflect toward each other, but spaced from one another to not directly oppose each other.

* * * * *

UNITED STATES PATENT AND TRADEMARK OFFICE
CERTIFICATE OF CORRECTION

PATENT NO. : 7,364,382 B2  Page 1 of 1
APPLICATION NO. : 11/505614
DATED : April 29, 2008
INVENTOR(S) : Steven M. Benedetti et al.

It is certified that error appears in the above-identified patent and that said Letters Patent is hereby corrected as shown below:

Column 5,
Line 24, delete "for" (first occurrence).

Column 6,
Line 17, delete "both".

Signed and Sealed this

Fourteenth Day of April, 2009

JOHN DOLL
*Acting Director of the United States Patent and Trademark Office*